United States Patent
Ervin

(10) Patent No.: US 6,772,675 B2
(45) Date of Patent: Aug. 10, 2004

(54) APPARATUS FOR PREPARING FROZEN DRINKS

(76) Inventor: David Ervin, P.O. Box 1639, Marrero, LA (US) 70073

( * ) Notice: Subject to any disclaimer, the term of this patent is extended or adjusted under 35 U.S.C. 154(b) by 0 days.

(21) Appl. No.: 10/330,795

(22) Filed: Dec. 30, 2002

(65) Prior Publication Data

US 2003/0145734 A1 Aug. 7, 2003

Related U.S. Application Data

(63) Continuation-in-part of application No. 09/892,041, filed on Jun. 26, 2001, now abandoned.

(51) Int. Cl.[7] .................................................. A23L 2/00
(52) U.S. Cl. ............................. 99/275; 99/290; 99/300; 241/DIG. 17; 241/101.2
(58) Field of Search .......................... 99/275, 290, 300, 99/484; 241/101.2, DIG. 17; 366/197

(56) References Cited

U.S. PATENT DOCUMENTS

| | | |
|---|---|---|
| 1,722,031 A | 7/1929 | Bert |
| 4,092,721 A | 5/1978 | Rueff et al. |
| 4,718,610 A | 1/1988 | Gallaher |
| 5,050,809 A | 9/1991 | Rupp |
| 5,323,691 A | 6/1994 | Reese et al. |
| 5,619,901 A | 4/1997 | Reese et al. |
| 5,653,157 A | 8/1997 | Miller |
| 5,692,392 A | 12/1997 | Swier |
| 5,772,075 A | 6/1998 | Ash, Jr. et al. |
| 5,778,761 A | 7/1998 | Miller |
| 5,799,832 A | 9/1998 | Mayo |
| 5,950,448 A | 9/1999 | Barnes et al. |
| 5,960,701 A | 10/1999 | Reese et al. |

*Primary Examiner*—Reginald L. Alexander
(74) *Attorney, Agent, or Firm*—Keaty Professional Law Corporation

(57) ABSTRACT

Frozen beverage mixing unit has a hollow housing with an open bottom. A shaving disc with a cutting knife is rotationally mounted inside the housing, the shaving disc being connected to a motor. A piston moves above the shaving disc pushing a frozen product into a contact with the cutting blades of the shaving disc. A plurality of pumps deliver a pre-determined amount of a selected additive, such as alcohol, syrup, carbonated water or water, on top of the shaving disc to mix with the ice crystals created by the shaved frozen product. The additive is mixed with the shaved frozen product in a mixing container placed below the shaving disc.

23 Claims, 3 Drawing Sheets

APPARATUS FOR PREPARING FROZEN DRINKS

CROSS-REFERENCE TO RELATED APPLICATIONS

This application is a continuation-in-part of my application Ser. No. 09/892,041 filed on Jun. 26, 2001 now abandoned for "An apparatus for Preparing Frozen Beverages," the full disclosure of which is incorporated by reference herein.

BACKGROUND OF THE INVENTION

This invention relates to dispensing machines, and more particularly, to an apparatus for preparing liquids containing frozen substances, such as daiquiris, slush drinks, and the like.

Many beverages require a frozen or refrigerated component, which is usually mixed with flavored syrups, carbonated liquids, alcoholic liquid and other components. The taste and flavor of the drinks vary depending on the additional ingredients used, from fruit juice to cola syrup to alcoholic beverage.

A restaurant or a bar that serves frozen drinks oftentimes is equipped with a battery of mixing and ice crushing machines that are required to prepare the product ordered by a customer. These machines take up a considerable amount of counter space, which adversely affects the efficiency of the operation, especially in locations where space is at a premium. As a result, there exists a need for the creation of a mixing machine that can be used in the preparation of various types of concoctions with a frozen product, while occupying a minimum amount of space.

The present invention contemplates provision of such type of a machine that can be used for producing daiquiris, frozen cocktails, frozen fruit drinks, non-alcoholic drinks, and frozen carbonated beverages with a frozen component, such as smoothies, and the like.

SUMMARY OF THE INVENTION

It is, therefore, an object of the present invention to provide a mixing machine for producing a beverage having a frozen ingredient.

It is another object of the present invention to provide a machine for making frozen concoctions with alcoholic and non-alcoholic components.

It is a further object of the present invention to provide a machine for preparing frozen beverages that is easy to use and inexpensive to manufacture.

These and other objects of the present invention are achieved through a provision of an apparatus that shaves and crushes frozen material, dispensing the shavings together with a desired liquid such as alcohol, water, carbonated water or syrup. The frozen drinks machine comprises a horizontal base having a small "footprint" to occupy a small space on a counter or other horizontal surface. Mounted on the base is housing secured to an upright support. The housing encloses rotating portions of the operating assembly.

The frozen drinks machine, or unit has an electronic programmable logic controller that controls operation of the motors, pumps and shaving disc. A rotating shaft is connected to a drive motor; the rotating shaft has a shaving disc secured thereto, such that rotation of the shaft causes rotation of the shaving disc when a frozen slab is being cut, or shaved. A gear motor operates movement of a piston, or ram that pushes the frozen slab against the top surface of the shaving disc. The shaving blades of the shaving disc gradually cut, or shave the frozen product, breaking the frozen slab into a multitude of ice crystals.

The unit has a plurality of pumps, each connected to a source of an additive outside of the housing. The additive may be an alcoholic liquid, such as rum, vodka, water, carbonated water or it may be syrup or juice. A plurality of liquid conduits lead from the pumps to a piston chamber, below which the shaving disc is positioned. The pumps, controlled by the logic controller, dispense a pre-determined quantity of the selected additive, through a nozzle, on top of the shaving disc.

The additive is mixed with the shaved off crystals and is allowed to travel into the slots formed in the shaving disc adjacent the shaving blades. The mixture travels through a plurality of dispensing channels spiraling through the shaving disc and fluidly communicating with the slots formed in the disc.

A lower part of the rotating shaft serves as an auger' it is provided with mixing blades that stir the mixture in a dispensing container strategically placed below an open chute, or shroud covering the shaving disc. The dispensing container is positioned such that the auger and the mixing blades are located inside the dispensing container during mixing.

An access door is provided in the front wall of the housing to allow positioning of the frozen slab inside the piston compartment. Once the access door is closed, an operator activates the logic controller. By pressing a selected button on the control panel, the operator sends a signal to a selected pump for delivery of the desired additive to the housing.

The unit is provided with safety start/reset button to terminate operation of the motors upon demand. The unit may be programmed to deliver rinsing water to the shaving disc after each shaving cycle or after a number of shaving cycles.

BRIEF DESCRIPTION OF THE DRAWINGS

Reference will now be made to the drawings, wherein like parts are designated by like numerals, and wherein

FIG. 4 is a detail view of the shaving disk of the apparatus in accordance with the present invention.

DETAIL DESCRIPTION OF THE PREFERRED EMBODIMENT

Figure 1:
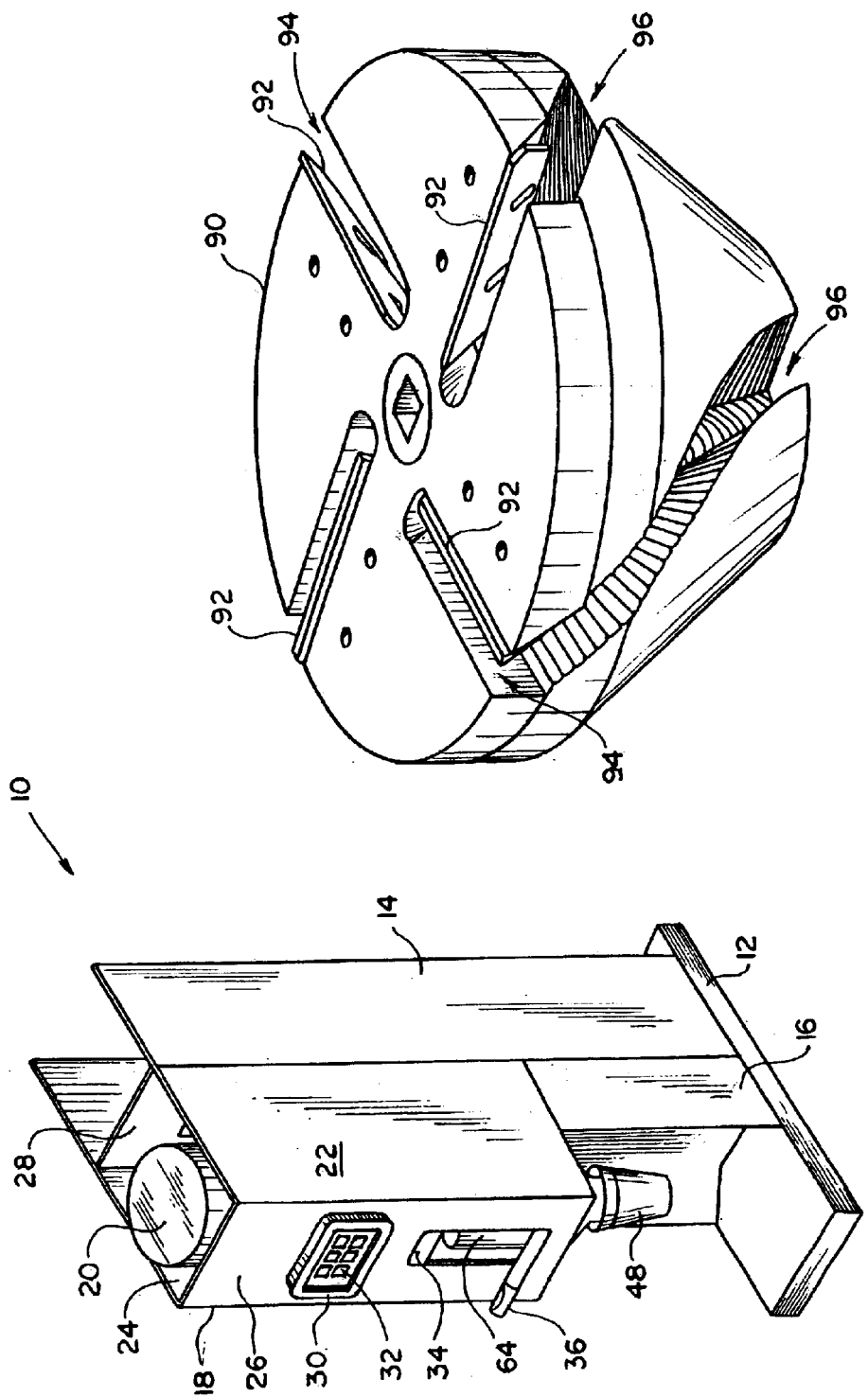
FIG. 1 is a perspective view of the apparatus of the present invention.

Turning now to the drawings in more detail, numeral 10 designates the frozen drinks machine, or unit of the present invention. The unit 10 comprises a horizontal base 12, and an upright support 14 fixedly attached to and extending upwardly from the base 12. Secured to the front of the upright support 14 is housing support 16, which is fixedly attached to the base 12 in front of the upright support 14.

Mounted on top of the housing support 16 is a housing 18, which encloses a drive motor 20 and an associated rotating assembly. The housing 18 has a pair side walls 22, 24 a front wall 26 and a rear wall 28. Secure to the front wall 26 is a control panel 30 provided with a plurality of buttons 32 for controlling the operation of the unit 10.

Figure 2:
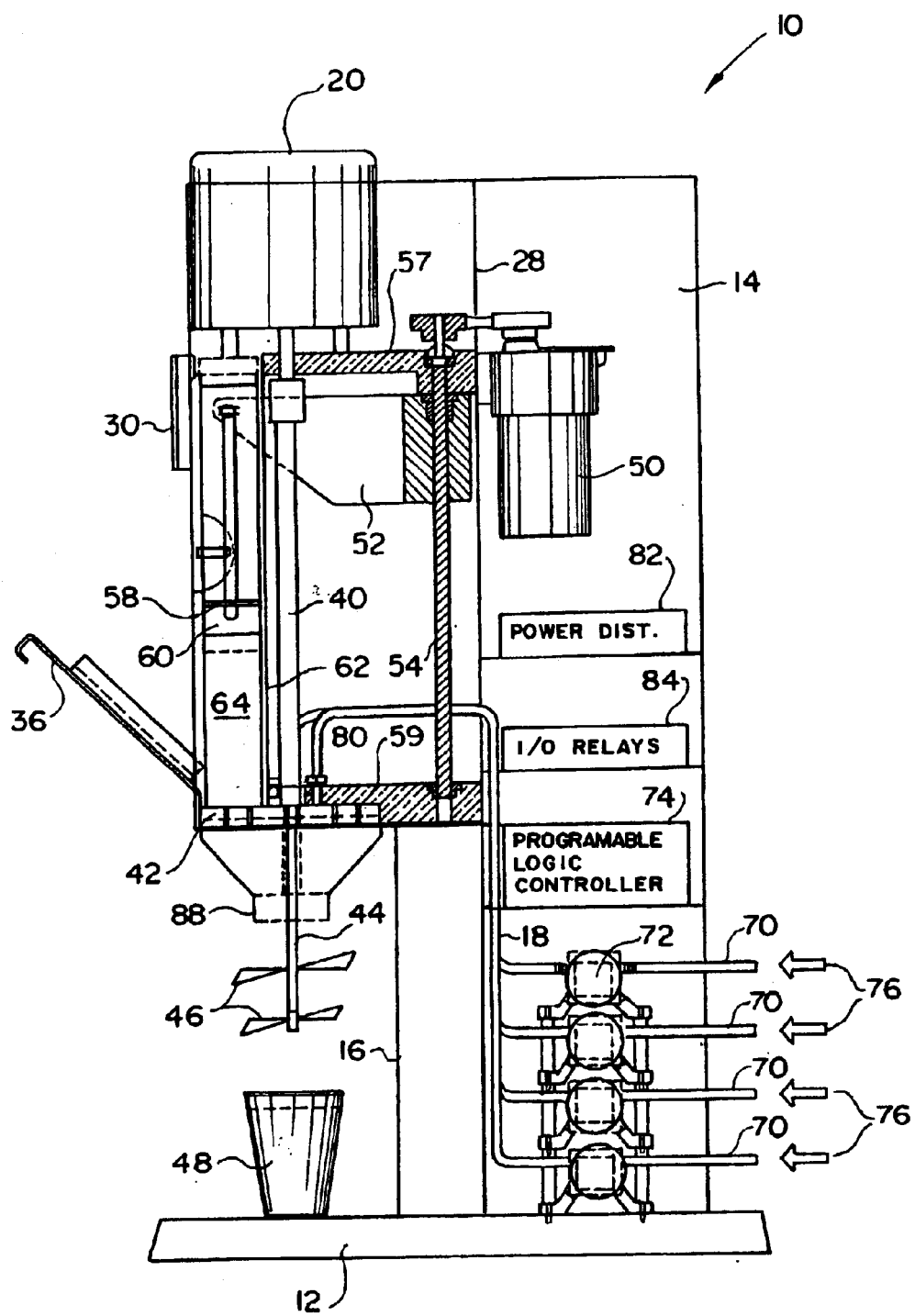
FIG. 2 is a side view, with a portion of the housing being removed for clarity to show operation of the machine, and with a housing door open.
Figure 3:
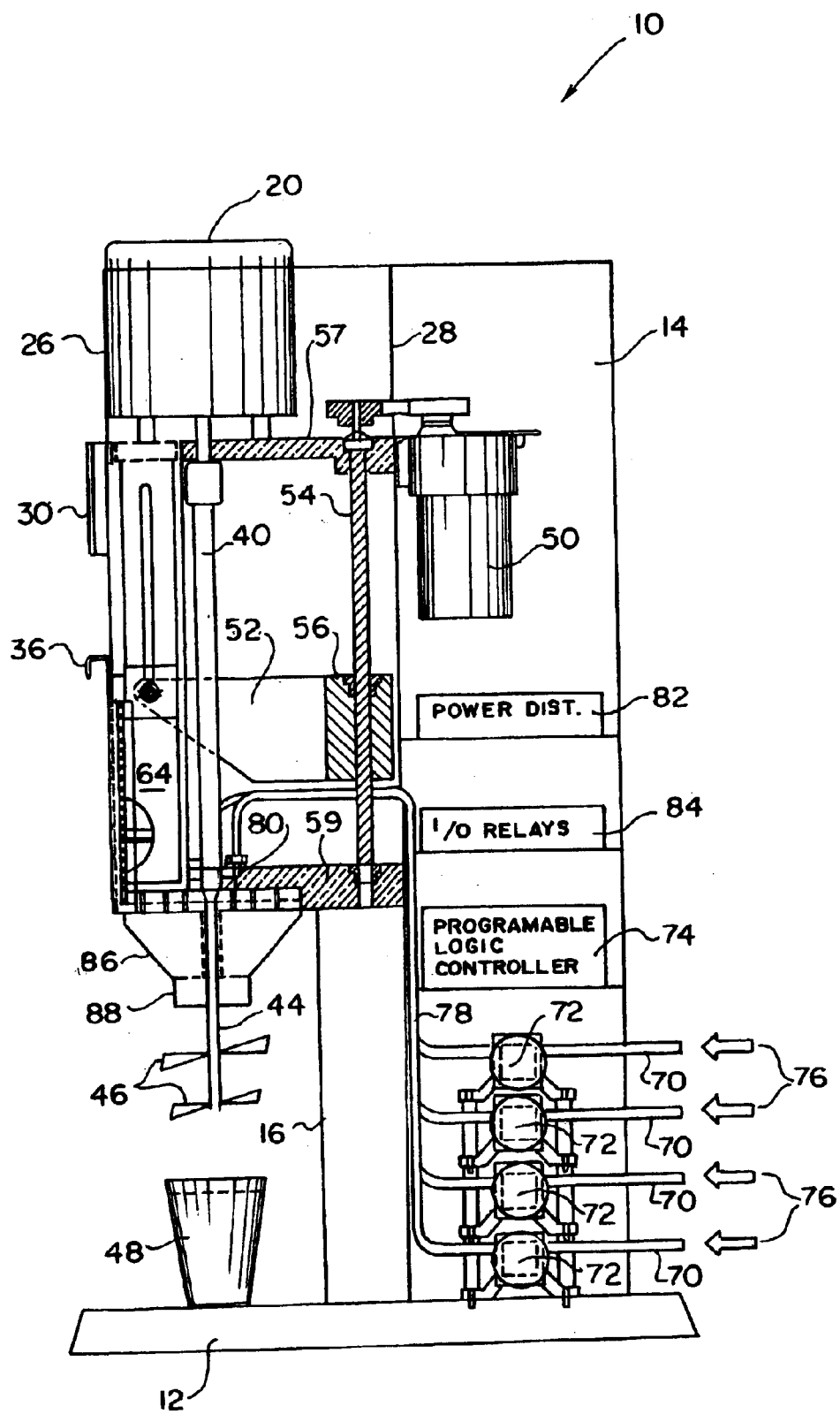
FIG. 3 is a side view of the apparatus of the present invention, with the housing door closed.

An opening 34 is formed in the front wall 26 below the control panel 20. The opening 34 has a hinged door 36 that moves between an open position shown in FIG. 2 and a closed position, shown in FIG. 3, covering access to the housing once a block of frozen material has 20 been positioned therein.

The housing 18 housing a rotating shaft 40 operationally connected to the drive motor 20. The shaft 40 extends downwardly from the motor 20 to an auger/shaving assembly 42. A distant end 44 of the shaft 40 carries a plurality of mixing blades 46, which are adapted for mixing the frozen drink or beverage in a mixing container 48.

A gear motor 50 is mounted within an enclosure defined by the upright support 14. The gear motor 50 moves a carriage block 56 up (FIG. 2) and down (FIG. 3) along a threaded rod 54. The threaded rod is secured in a vertical orientation within the housing 18, between an upper retainer 57 and a lower retainer 59.

The carriage block 56 is secured to a carriage bracket 52. The carriage bracket extends at a right angle in relation to a vertical axis defined by the threaded rod 54. A free end of the carriage bracket 52 is operationally connected to a cylinder ram, or piston 58. The piston 58 is mounted for a slidable vertical movement within a cylindrical piston chamber 60. The piston chamber 60 communicates with the opening 34 within the housing 18. Access to the piston chamber is allowed through the opening 34 by moving the hinged door 36 into an open position.

A cylindrical frozen substance container 62 is removeably positioned within the compartment 60. The container 62 holds a pre-determined quantity of a frozen substance 64, such as water, dairy products, fruit puree or juice therein. The container 62 has open top and bottom, allowing the piston, or ram 58 to push against the top surface of the frozen block 64 and move the frozen substance against the auger/shaving assembly 42.

The unit 10 comprises a plurality of liquid conduits 70, which are connected to sources of alcoholic liquids, water, carbonated water, syrups, etc. (not shown). The conduits 70 extend from the back of the unit 10 into the housing 18 for delivery of a variety of selected liquids to the auger/shaving assembly 42, where the liquids are mixed with the crushed frozen substance. Each conduit 70 has a dedicated liquid pump 72, which facilitates transfer of the liquid from an outside source to the unit 10.

A programmable logic controller assembly 74 is operationally connected to the pumps 72 and to the control panel 30 to regulate the amount of alcohol or other liquid additives during a grinding cycle. One of the buttons 32 of the control panel 30 must be activated by an operator to deliver the desired liquid. Once the button is depressed, an electrical connection is established, sending a signal to the assembly 74 to start operation of the pre-determined pump and to deliver a pre-determined amount of the liquid to the auger/shaving assembly 42.

The desired liquid flows from a source of the liquid (not shown) in the direction of an arrow 76 into a respective conduit 70. The liquid is then delivered by a respective pump 72 into an inner liquid conduit 78 to an injection nozzle 80 located just above the auger/shaving assembly 42. The liquid mixes with the ice shavings and flows by gravity into the mixing container 48, where the resultant mixture is mechanically stirred by the blades 46.

A power distribution unit 82 is provided within the enclosure defined by the upright support 14. Electrical relays 84 are positioned in the unit 10 and are operationally connected with the electrical circuits of the unit 10. The logic controller 74 controls the sequence of events and timing of all electronic components of the unit 10. One of the buttons 32 of the control panel 30 is a start/stop reset button and commands the unit 10 to void any pending operation, returning the carriage bracket 52 and the ram 58 into the "up" position. Another button 32 provides a periodic cleaning cycle activating a water pump for rinsing the shaving disk, thus preventing accumulation of ice shavings and possible mixing of flavors.

A shroud 86 is secured below the auger/shaving assembly 42. A top portion of the shroud 86 has a diameter substantially equal to a shaving disk 90, thus protecting an operator from contact with the rotating shaft 40 and the ice shavings that might escape from the shaving disk 90. The shroud has a cone-shaped body, with a gradually reducing diameter. The bottom portion 88 of the shroud 86 has a diameter substantially smaller than the diameter of an open top of the mixing container 48. A portion 44, of the shaft 40, which becomes part of the auger/shaving assembly 42, extends through the protective shroud 86, carrying the mixing blades 46 on the lower part thereof.

FIG. 4 illustrates in detail the shaving disk 90 of the auger/shaving assembly 42. The disk 90 is provided with a plurality of razor blades 92 that are made from stainless steel or other similar non-corrosive material. The blades 92 grind the frozen beverage 64 into fine ice crystals. A plurality of auger slots 94 are formed in the disk 90 next to each blade 92 to allow the shaved ice pieces to move below the disk 90. The slots 94 communicate with downwardly spiraling channels 96. The auger may be perforated to increase overrun by adding air to the shaved product.

In operation, a user opens the door 36 and positions a container 62 with the frozen substance inside the chamber 60. The user then closes the door 36, which sends a signal to the electronic components, allowing operation of the unit 10. The user then lifts the container 48 and aligns the open top of the container 48 with the open bottom 88 of the shroud 86. The user makes sure that the mixing blades 46 are located inside the container 48.

The user then presses one of the buttons 32 on the control panel 30 that activates one of the pumps. Four of the buttons 32 are controlled by the programmable logic controller 74. Pressing one of these four buttons activates a respective pump 72 to dispense a pre-determined amount of a desired alcohol, carbonated water, syrup or water onto the auger shaving assembly 42.

The drive motor 20 and the gear motor 50 become activated. The drive motor rotates the shaft 40 and the shaving disk 90. The gear motor 50 turns the threaded rod 54 forcing the carriage block 56 and the carriage bracket 52 downwardly. The carriage bracket 52 pushes the cylinder piston 58 against the top of the frozen beverage 64. The downward action presses the bottom of the frozen beverage 64 against the rotating disk 90 and the blades 92. The frozen block 64 is gradually shaved into fine ice crystals.

The shaved particles are then channeled through the slots 94 and the channels 96 out of the shroud lower open end 88 and into the mixing container 48, where the ice particles mixed with the alcohol, water, carbonated water, syrup are stirred by the blades 46. As a result, the unit 10 produces a homogeneous frozen drink mixture, slush beverage, or other similar frozen concoction.

After the finished beverage is made, the drive motor 20 turns off, and the gear motor 50 activates, returning the carriage bracket 52 to the "up" position, ready for making another drink. The operator then opens the door 36 and removes the empty container 62. If desired the container 62 can be made disposable.

The logic controller may be programmed to activate a rinse cycle every time after the shaving and stirring steps are finished. Alternatively, the controller may be programmed to active a blade rinsing cycle after several shaving/mixing steps were performed. Water at the same time flushes the shaving disc 90, removing the taste and traces of the product from the disc and thereby making the machine ready for dispensing of a different type of flavor, if necessary.

A flavoring additive may be also dispensed through activation of the pumps 72. The alcohol delivered through the conduits 70 may be vodka, rum, tequila, water, carbonated water, or a non-alcoholic syrup, depending on the customer order. Depending on the size of the serving drink, the container 48 may hold small, medium, or large size of the beverage. The controller 74 is programmed to regulate the amount of fluid additives or flavoring delivered into the container 48.

The slab of the frozen product 64 is dispensed every time when the button 34 is pressed for operating the pump 72. The cup 96 is then removed from its position below the shroud bottom 88 and the drink is dispensed into a serving container. Any liquid that may remain on the shaft 44 or on the stirring blades 46 will drip into a removable tray (not shown) that can provided for placing on top of the base 12 below the shroud 86. The drip tray can be wiped by the operator or removed and cleaned when necessary.

The frozen product slab 64 may contain any desired ingredients, for instance chopped fruit, ice cream, etc. The slabs 64 of the frozen product can be prepared before hand and stored in marked containers next to the unit 10 to be selected by the operator upon the customer's request. The alcohol or other mixing liquids dispensed through the conduits 70 can be in a locked location to prevent unauthorized access.

The unit 10 of the present invention requires minimal space on the counter and virtually no equipment maintenance. The energy consumption is considerably less in comparison with other ice shaving units. The variety of flavors and product types, with or without alcohol, is virtually limitless, allowing the operator to dispense a multitude of flavored drinks, slushies and other types of frozen concoctions.

The unit 10 is lightweight and, easily transportable from one location to another and can be set up for operation in minutes as long as there is access to an A/C power or a battery. There is virtually no product waste as the perishable items are stored in a frozen state in a freezer until ready for dispensing. The finished product in consistent in texture and taste; it requires minimal involvement from the operator.

The control panel is pre-programmed and provided with buttons to allow selection of alcohol or other mixing liquids for the desired product by a switch with four settings. For instance, a standard daiquiri can have rum and/or water, tequila and/or water, vodka and/or water, or only water, carbonated water or syrup for non-alcoholic beverages. The alcohol and water source containers can be provided with level indicators that are connected to the control panel to alert the operator if there is low alcohol or water-supply level.

Many other changes and modifications may be made in the design of the present invention without departing from the spirit thereof. I, therefore, pray that my rights to the present invention be limited only by the scope of the appended claims.

I claim:

1. An apparatus for preparing beverages with a frozen product, comprising:
    a hollow housing with an open bottom;
    a piston moveable inside the housing;
    a shaving disc with a plurality of cutting blades rotationally mounted below said piston, said shaving disc being adapted for shaving the frozen product positioned above said shaving disc, while the piston pushes downwardly against the frozen product to move the frozen product into a contact with the shaving disc;
    a means for delivering a predetermined type and quantity of a selected liquid additive to said shaving disc for combining with shavings of the frozen product.

2. The apparatus of claim 1, wherein said delivery means comprises a liquid pump connected to a source of the liquid additive mounted outside of said housing.

3. The apparatus of claim 1, further comprising a nozzle for delivering water on top of the shaving disc to wash away remnants of the frozen product from the shaving disc.

4. The apparatus of claim 1, further comprising a motor means provided with a rotating shaft extending through said housing, and wherein said rotating shaft is attached to the shaving disc such that activation of said motor means causes rotation of said shaving disc.

5. The apparatus of claim 4, wherein said rotating shaft extends below said shaving disc and carries a plurality of mixing blades on a lower portion thereof.

6. The apparatus of claim 5, wherein said housing comprises a dispensing shroud in a lower portion of the housing, and wherein said mixing blades are located outside of said dispensing shroud.

7. The apparatus of claim 1, further comprising a plurality of pumps, each pump, upon activation, delivering a predetermined quantity of a selected additive from a source outside of said housing.

8. The apparatus of claim 7, wherein each of said pumps is fluidly connected to a dispensing nozzle having an outlet above said shaving disc to facilitate mixing of the selected additive with the frozen product being cut by said shaving disc.

9. The apparatus of claim 8, further comprising a drive motor for rotating said shaft and a gear motor for moving said piston into a contact with said shaving disc.

10. The apparatus of claim 9, further comprising an electronic means for controlling operation of said drive motor, said gear motor and said plurality of pumps.

11. The apparatus of claim 10, wherein said housing is provided with a control panel having a plurality of control buttons, and wherein activation of selected control buttons causes activation of said electronic means.

12. The apparatus of claim 1, wherein said shaving disc comprises a plurality of shaving blades suitable for cutting the frozen product.

13. The apparatus of claim 1, wherein said shaving disc is provided with a slot adjacent to each of said shaving blades, and a channel communicating with each of said slots to allow the cut frozen product to travel by gravity outside of said housing.

14. The apparatus of claim 1, wherein said housing is provided with an access door to allow positioning of the frozen product inside said housing.

15. An apparatus for preparing beverages with a frozen product, comprising:

a hollow housing with an open bottom;

a gear motor secured to said housing;

a piston moveable inside the housing upon activation of said gear motor;

a drive motor mounted in the housing;

a shaving disc with a plurality of cutting blades rotationally mounted below said piston, said shaving disc being operationally connected to said drive motor and adapted for shaving the frozen product positioned above said shaving disc, while the piston pushes downwardly against the frozen product to move the frozen product into a contact with the shaving disc;

a means for delivering a pre-determined type and quantity of a selected liquid additive to said shaving disc for combining with shavings of the frozen product, said delivery means comprising at least one liquid pump connected to a source of the liquid additive mounted outside of said housing.

16. The apparatus of claim 15, wherein said rotating shaft extends below said shaving disc and carries a plurality of mixing blades on a lower portion thereof.

17. The apparatus of claim 16, wherein said housing comprises a dispensing shroud in a lower portion of the housing, and wherein said mixing blades are located outside of said dispensing shroud.

18. The apparatus of claim 15, further comprising a plurality of pumps, each pump, upon activation, delivering a pre-determined quantity of a selected additive from a source outside of said housing.

19. The apparatus of claim 18, wherein each of said pumps is fluidly connected to a dispensing nozzle having an outlet above said shaving disc to facilitate mixing of the selected additive with the frozen product being cut by said shaving disc.

20. The apparatus of claim 19, further comprising an electronic means for controlling operation of said drive motor, said gear motor and said plurality of pumps.

21. The apparatus of claim 20, wherein said housing is provided with a control panel having a plurality of selected control buttons causes activation of selected control buttons causes activation of said electronic means.

22. The apparatus of claim 15, wherein said disc is provided with a slot adjacent to each of said shaving blades, and a channel communicating with each of said slots to allow the cut frozen product to travel by gravity outside of said housing.

23. The apparatus of claim 15, wherein said housing is provided with an access door to allow positioning of the frozen product inside said housing.

* * * * *